(12) United States Patent
Narayana et al.

(10) Patent No.: US 12,086,955 B2
(45) Date of Patent: Sep. 10, 2024

(54) SCENE BUILDER

(71) Applicant: Target Brands, Inc., Minneapolis, MN (US)

(72) Inventors: Godha Narayana, Karnataka (IN); Madanmohan Atmakuri, Karnataka (IN); Gopikrishna Chaganti, Karnataka (IN); Anjali Unni, Karnataka (IN); Balraj Govindasamy, Karnataka (IN); Steve Samuel, Karnataka (IN)

(73) Assignee: Target Brands, inc., Minneapolis, MN (US)

( * ) Notice: Subject to any disclaimer, the term of this patent is extended or adjusted under 35 U.S.C. 154(b) by 366 days.

(21) Appl. No.: 17/695,624

(22) Filed: Mar. 15, 2022

(65) Prior Publication Data

US 2023/0298132 A1    Sep. 21, 2023

(51) Int. Cl.
  *G06T 3/4053* (2024.01)
  *G06F 3/04845* (2022.01)
  *G06T 19/20* (2011.01)
(52) U.S. Cl.
  CPC ........ *G06T 3/4053* (2013.01); *G06F 3/04845* (2013.01); *G06T 19/20* (2013.01); *G06T 2219/2004* (2013.01)
(58) Field of Classification Search
  None
  See application file for complete search history.

(56) References Cited

U.S. PATENT DOCUMENTS

| 7,277,572 | B2 | 10/2007 | Macinnes et al. |
| 7,330,183 | B1 * | 2/2008 | Russo ..................... G06T 15/04 |
| | | | 345/428 |
| 8,817,021 | B1 | 8/2014 | Hickman et al. |
| 9,002,946 | B2 | 4/2015 | Evans et al. |
| 9,147,279 | B1 | 9/2015 | Bruce et al. |
| 9,460,542 | B2 | 10/2016 | Miller et al. |

(Continued)

FOREIGN PATENT DOCUMENTS

EP    2780802 B1    3/2017

OTHER PUBLICATIONS

Matt Ciarletto, Building a Living 3D Rendering Platform, https://www.aboutwayfair.com/tech-innovation/building-a-living-3d-rendering-platform; Dated: Oct. 11, 2017; 8 Pages.

(Continued)

*Primary Examiner* — Kee M Tung
*Assistant Examiner* — Jed-Justin Imperial
(74) *Attorney, Agent, or Firm* — Merchant & Gould P.C.

(57) ABSTRACT

A platform, web application, system, and methods are disclosed for creating digital 3D scenes having digital 3D objects and for creating images of the digital 3D scenes. The platform can be communicatively coupled with the web application. The platform can apply a multi-stage method to convert high-fidelity digital 3D objects into low-fidelity digital 3D objects, store a mapping between them, and transmit low-fidelity digital 3D objects to the web application. The web application can include user interfaces for manipulating low-fidelity digital 3D objects to create low-fidelity digital 3D scenes. The platform can automatically convert low-fidelity digital 3D scenes received from the web application into high-fidelity digital 3D scenes and create high-fidelity 2D images.

20 Claims, 9 Drawing Sheets

(56) References Cited

U.S. PATENT DOCUMENTS

| | | | |
|---|---|---|---|
| 10,712,923 | B1 | 7/2020 | Pathmanathan |
| 10,868,890 | B2 | 12/2020 | Miller et al. |
| 2014/0184602 | A1 | 7/2014 | Tuffreau et al. |
| 2017/0287229 | A1* | 10/2017 | Mulqueen ............... G06T 17/10 |
| 2023/0008567 | A1* | 1/2023 | Zikos ..................... G06T 17/00 |

OTHER PUBLICATIONS

How Ikea 3D Models the Rooms in Their Catalogs, https://architizer.com/blog/practice/details/see-how-ikea-3d-models-the-rooms-in-their-catalogs/; Dated: Oct. 14, 2021; 10 Pages.

3D scene maker—Create stunning 3D designs with Vectary, https://www.vectary.com/3d-modeling-how-to/3D-scene-how-to-create-3D-scenes/; Dated: May 31, 2018; 9 Pages.

Rendering Basics, https://clara.io/learn/user-guide/rendering/rendering_basics; Dated: Oct. 14, 2021; 7 Pages.

Blender.org: Blender is a downloadable, open-source 3D creation program that can perform the full suite of 3D modeling, including building scenes; Printed/Dated: Oct. 14, 2021; 6 Pages.

* cited by examiner

SCENE BUILDER

BACKGROUND

In the past, physical photo shoots were used to create images of scenes depicting products. Physical photo shoots, however, have drawbacks. For example, they can be expensive and time-consuming to organize, and once they are finished, it can be difficult to edit the images. Recently, computer-generated imagery (CGI), rather than staged physical photo shoots, has been used to create images of scenes. For example, a designer can create a digital three-dimensional (3D) scene using digital 3D objects. Once complete, the designer can create a digital two-dimensional (2D) image of the 3D scene. There are benefits to using CGI. For example, using CGI can be cheaper than staging physical photo shoots, designers have more options when creating scenes, the images can be digitally saved and more easily edited later, and the images can closely imitate photos.

There are challenges, however, when using CGI to create scenes. In particular, there are technical challenges when the digital 3D scenes, and the digital 3D objects used to create the scenes, are high quality, or high fidelity. For example, high-fidelity 3D objects are often large, and to use and manipulate them, a combination of specialized skills, software, and hardware may be required. Thus, it can be impractical or costly to use high-fidelity 3D objects in certain computing environments or applications, thereby limiting the usefulness of CGI. Some enterprises, therefore, may forgo CGI, or if they do use it, may use low-fidelity 3D objects resulting in low-fidelity 2D images.

SUMMARY

In general, the subject matter of the present disclosure relates to using CGI to create images of scenes. In particular, the subject matter of the present disclosure relates to a web application and a platform for creating digital 3D scenes and images of digital 3D scenes.

In an example aspect, a scene builder platform is disclosed. The scene builder platform comprises a processor and a memory storing instructions. The instructions, when executed by the processor, cause the scene builder platform to convert a digital 3D object from a high-fidelity 3D object into a low-fidelity 3D object, store a mapping between the high-fidelity 3D object and the low-fidelity 3D object, transmit the low-fidelity 3D object to a web application, receive, from the web application, a low-fidelity 3D scene, convert, using the mapping, the low-fidelity 3D scene into a high-fidelity 3D scene, and create a high-fidelity 2D image of the high-fidelity 3D scene.

In a second aspect, a web-based scene builder is disclosed. The web-based scene builder comprises a processor and a memory storing instructions. The instructions, when executed by the processor, cause the web-based scene builder to receive a low-fidelity 3D object from a platform, the platform storing a mapping between the low-fidelity 3D object and a high-fidelity 3D object. The instructions also cause the web-based scene builder to display, via a web browser, a user interface, wherein the user interface comprises a plurality of manipulatable low-fidelity 3D objects for creating a low-fidelity 3D scene, transmit, in response to receiving a render request, the low-fidelity 3D scene to the platform, the render request comprising a camera angle from which to create a high-fidelity 2D image of the low-fidelity 3D scene, and receive, from the platform, the high-fidelity 2D image of the low-fidelity 3D scene.

In a third aspect, a scene builder system is disclosed. The scene builder system comprises a platform and a web application. The platform comprises a platform processor and a platform memory storing platform instructions. The web application comprises a web application processor and a web application memory storing web application instructions. The platform instructions, when executed by the platform processor, cause the platform to convert a digital 3D object from a high-fidelity 3D object into a low-fidelity 3D object; store a mapping between the high-fidelity 3D object and the low-fidelity 3D object; transmit the low-fidelity 3D object to the web application; receive, from the web application, a low-fidelity 3D scene; convert, using the mapping, the low-fidelity 3D scene into a high-fidelity 3D scene; create a high-fidelity 2D image of the high-fidelity 3D scene; and transmit the high-fidelity 2D image to the web application. The web application instructions, when executed by the web application processor, cause the web application to receive the low-fidelity 3D object from the platform; display, via a web browser, a user interface, wherein the user interface comprises a plurality of manipulatable low-fidelity 3D objects for creating a low-fidelity 3D scene; transmit, in response to receiving a render request, the low-fidelity 3D scene to the platform; and receive, from the platform, the high-fidelity 2D image.

DETAILED DESCRIPTION

Figure 1:
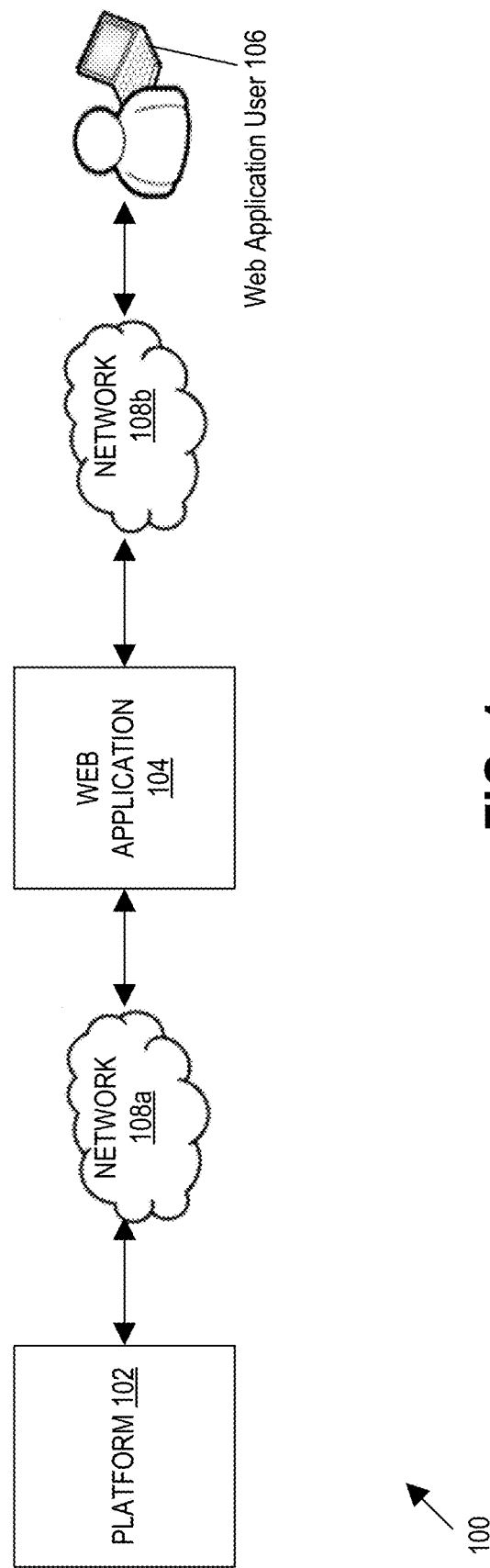
FIG. 1 illustrates a network in which aspects of the present disclosure can be implemented.

As briefly described above, embodiments of the present disclosure relate to using CGI to create images of scenes. Example aspects of the present disclosure include a scene builder platform and a scene builder web application. The platform can create high-fidelity 3D objects by using a computer graphics program, or the platform can receive high-fidelity 3D objects from another system. In some embodiments, the 3D objects can represent products, templates of scenes, or props. In example aspects, the platform includes an object conversion service that converts high-fidelity 3D objects into low-fidelity 3D objects. As part of this conversion, the object conversion service can, in some embodiments, store information mapping high-fidelity 3D objects to low-fidelity 3D objects, thereby storing information about which high-fidelity 3D object corresponds to which low-fidelity 3D object, and vice-versa. In some embodiments, the platform can then send low-fidelity 3D objects to the scene builder web application.

In example aspects, the web application is communicatively coupled with the platform and can receive data from it, such as low-fidelity 3D objects. The web application can include user interfaces with manipulatable low-fidelity 3D objects and features for creating scenes. In some embodiments, a user of the user interface can, among other things, drag and drop objects, adjust object properties, change the camera angle, rotate and scale objects, and collaborate with other users. In example aspects, the web application can send a low-fidelity 3D scene, created by a user via the user interface, to the platform. Among other things, the low-fidelity 3D scene can contain a plurality of low-fidelity 3D objects and a spatial relationship between the objects. The web application can also send other data to the platform, such as metadata and parameters regarding how the scene is to be rendered as a 2D image.

In example aspects, the platform can receive the low-fidelity 3D scene and automatically convert it into a high-fidelity digital 3D scene. For example, the platform can automatically parse the low-fidelity 3D scene, access a stored mapping between high-fidelity 3D objects and low-fidelity 3D objects, and select which high-fidelity 3D objects to use to create the high-fidelity 3D scene. The platform can then automatically perform adjustments on the high-fidelity 3D objects (e.g., related to positioning, size, or camera angle), as determined by the information received from the web application. Furthermore, once the high-fidelity 3D scene is created, a designer can, in certain embodiments, use components of the platform, such as a computer graphics program, to make changes that were not made in web application. In example aspects, the platform can then render the high-fidelity 3D scene as a high-fidelity 2D image. Both the high-fidelity 3D scene and 2D image can be stored and made available to the web application. The high-fidelity 2D image can then be used, for example, on a website or in marketing materials.

Certain embodiments of the present disclosure have numerous technical features that make them particularly advantageous over existing tools. For example, certain embodiments of the present disclosure provide a system for using CGI to create images of scenes, thereby avoiding the need for physical photo shoots. Furthermore, aspects of the present disclosure can efficiently convert large (and sometimes unusable in a web application context) high-fidelity 3D objects into smaller, low-fidelity 3D objects that can be incorporated into a web application and manipulated via a user interface. Consequently, certain embodiments of the present disclosure reduce the need for specialized skills, software, and hardware.

Furthermore, by making CGI tools available via a web application, aspects of the present disclosure increase access to CGI tools, thereby increasing collaboration among users and giving an entity more flexibility with how 3D scenes and 2D images are shared, stored, and distributed. Furthermore, in some embodiments, although the web application uses low-fidelity object to create scenes, it can nevertheless receive, and return to the user, high-fidelity 2D renderings of scenes without needing to transmit a high-fidelity 3D scene for rendering over a networked connection, or for rendering within a browser. Furthermore, certain embodiments of the present disclosure improve efficiency by automating processes described herein. Furthermore, in certain embodiments, a single entity can have control of the full automated pipeline, thereby giving the entity control over, among other things, what objects can be used to create 3D scenes, how conversions are performed, and how aspects of the present disclosure interact. As will be apparent, these are only some of the advantages offered by the invention of the present disclosure.

FIG. 1 illustrates an example network environment 100 in which aspects of the present disclosure can be implemented. The network environment 100 can include, among other things, a scene builder platform 102, a scene builder web application 104, and a web application user 106. As further described below, the platform 102, the web application 104, and a device used by the user 106 can be implemented in a computing system, such as the system 900 of FIG. 9. The network environment 100 can also include networks 108a-b. Each network of networks 108a-b can be, for example, a wireless network, a wired network, a virtual network, the Internet, or any other type of network. Furthermore, each network of the networks 108a-b can be divided into subnetworks, and the subnetworks can be different types of networks or the same type of network.

As shown in the example of FIG. 1, the platform 102 can be communicatively coupled via the network 108a with the web application 104. In some embodiments, as is further described below, the platform 102 can send data, such as low-fidelity 3D objects, to the web application 104. The web application 104 can then incorporate the low-fidelity 3D objects in a user interface used to create low-fidelity 3D scenes comprising a plurality of low-fidelity 3D objects. The web application 104 can then send the low-fidelity 3D scene to the platform 102, which can, after converting the low-fidelity 3D scene and rendering it, return a high-fidelity 2D image to the web application 104.

The web application 104 can be communicatively coupled via the network 108b with the web application user 106. In some embodiments, the user 106 can use a web browser running on a device of user 106, and the web browser can access and run the web application 104. The user 106 can, via a user interface of the web application 104, create low-fidelity 3D scenes and use other features of the web application 104. The user 106 can be, for example, a designer, a product manager, or a member of a marketing team. In addition to what is depicted in the example of FIG. 1, there can be other networks, components, or connections in certain embodiments in the network environment 100.

Figure 2:
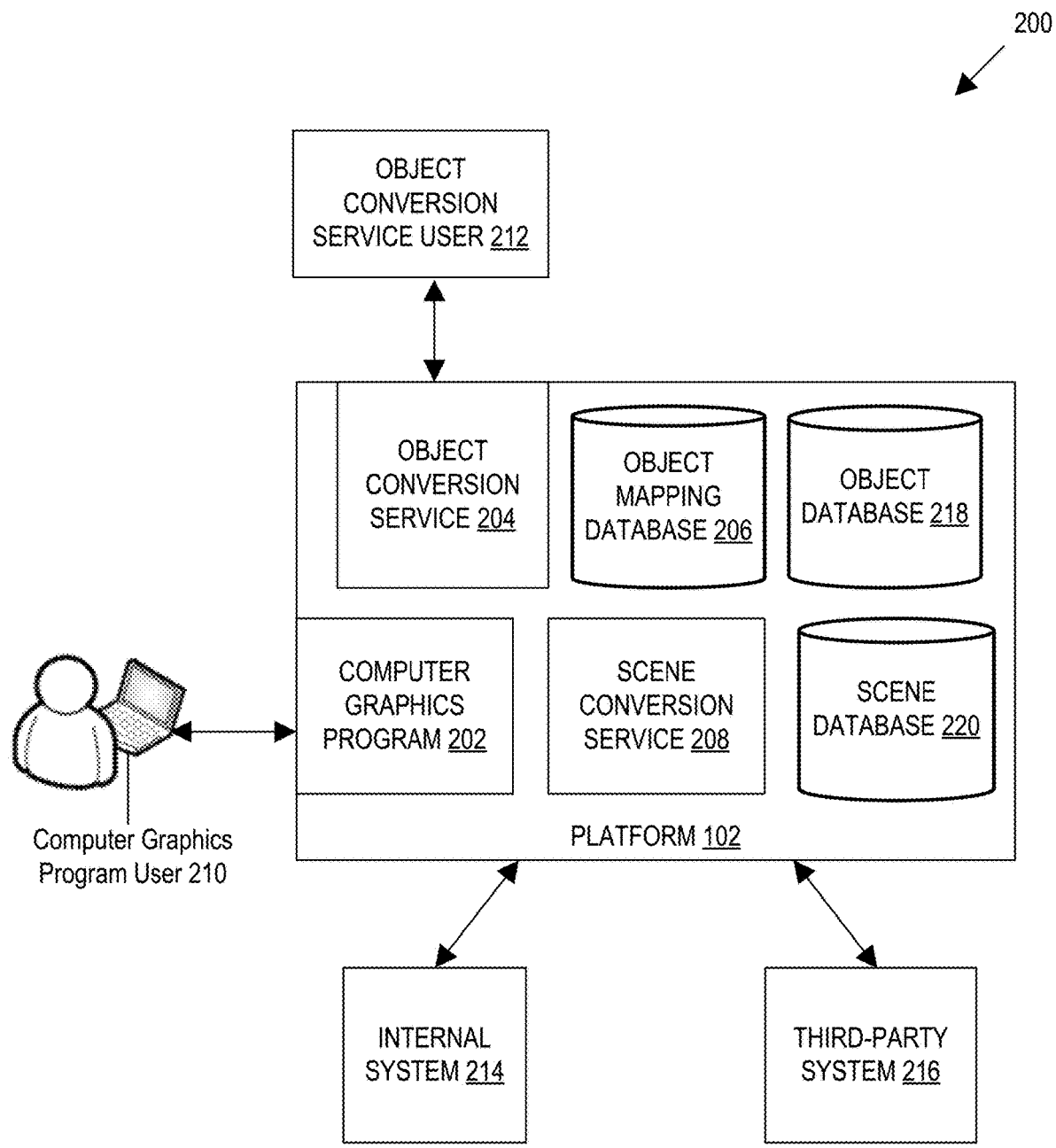
FIG. 2 illustrates a platform network in which aspects of a scene builder platform can be implemented.

FIG. 2 illustrates a platform network 200 in which aspects of the present disclosure can be implemented. As shown, the platform 102 can include several components and can be communicatively coupled with other systems or entities. In some embodiments, the components of the platform can include a computer graphics program 202, an object conversion service 204, an object mapping database 206, a scene conversion service 208, an object database 218, and a scene database 220. The components of the platform 102 can be implemented in the same computing environment or in different computing environments that are communicatively coupled. In some embodiments, the platform 102 can contain more or less components than those illustrated in the example of FIG. 1, and the operations of the components, which are further described below, can overlap depending on the embodiment.

The computer graphics program 202 can be a program for digital 3D modeling, animation, rendering, and visualization. The computer graphics program 202 can use, for example, polygonal modeling techniques or other 3D modeling techniques. As an example, the computer graphics program can be 3Ds Max, Blender, or another computer graphics program capable of modeling and rendering high-fidelity 3D objects. The computer graphics program 202 can be capable of running scripts, and it can be directly accessed by a computer graphics program user 210. Among other things, the user 210 can, for example, create and edit 3D scenes or 3D objects by using the computer graphics program 202.

The object conversion service 204 (or level of detail service) can include a plurality of services for compressing and converting digital 3D objects. As is further described below, the object conversion service 204 can convert a digital 3D object from a high-fidelity digital 3D object to a low-fidelity 3D object. The fidelity of a 3D object can, in some embodiments, refer to a polygon count or a vertex count of a 3D object; in other embodiments, the fidelity can refer to the resolution of the 3D object on a screen; in yet other embodiments, the fidelity can refer to other metrics related to the representation of the 3D object. When referring to 2D images, the fidelity can refer, in some embodiments, to the pixel count or pixel density of an image; and in other embodiments, the fidelity can refer to other metrics related to a visual representation of the 2D image.

As is further described below, the object conversion service 204 can, in some embodiments, apply a plurality of rounds of file conversion, a series of compressions, and optimizations to convert a 3D object from a high-fidelity 3D object to a low-fidelity 3D object. Furthermore, in some embodiments, the object conversion service 204 can group 3D objects to form composite high-fidelity 3D objects, and the object conversion service 204 can select subcomponents of high-fidelity 3D objects. In some embodiments, the object conversion service 204, or another component of the platform 102, can store high-fidelity 3D objects and low-fidelity 3D objects in the object database 218.

As shown in the example of FIG. 2, the object conversion service 204 can also be used by other users or systems besides the platform 102. For example, the object conversion service 204 can be exposed as an application programming interface (API), and an object conversion service user 212 can connect to the API to use the object conversion service 204.

When converting high-fidelity 3D objects into low-fidelity 3D objects, the object conversion service 204 can store a mapping between high-fidelity 3D objects and low-fidelity 3D objects in the object mapping database 206. For example, the object mapping database 206 can store information indicating which low-fidelity 3D object corresponds to which high-fidelity 3D object, and vice-versa. Furthermore, the object conversion service 204 can also store such data in the object mapping database 206 when the object conversion service 204 converts composite or component high-fidelity objects to low-fidelity composite or component objects. The object conversion service 204 is further described below in connection with FIGS. 3-4.

In some embodiments, the scene conversion service 208 can, among other things, receive a low-fidelity 3D scene and convert it into a high-fidelity 3D scene. In particular, in some embodiments, the scene conversion service 204 can receive information from the web application 104, parse the information, and create scripts executable by the computer graphics program 202 for converting a low-fidelity 3D scene into a high-fidelity 3D scene, as is further described below in connection with FIGS. 3 and 5. In some embodiments, the scene conversion service 208 can store high-fidelity 3D scenes and low-fidelity 3D scenes in the scene database 220.

As shown in the example of FIG. 2, the platform 102 can also be communicatively coupled with other systems. For example, the platform 102 can be connected to an internal system 214, a third-party system 216, and to other web applications (not shown). The internal system 214 can be a system that is operated by an entity that also operates the platform 102. For example, the internal system 214 can be a system that provides information about the products represented by the 3D objects. In some embodiments, if there is a new product, or if a product is discontinued, then the internal system 214 can communicate this information to the platform 102. The platform 102, in turn, can create a new 3D object (e.g., using the computer graphics program 202) to represent the new product, or the platform 102 can remove from its storage a 3D object representing a discontinued product. Furthermore, the internal system 214 can send other information to the platform 102.

The third-party system 216 can be a system that is operated by an entity that does not own or operate the platform 102. In some embodiments, the third-party system 216 can be a vendor system that sends the platform 102 information related to products or 3D objects. In some embodiments, the internal system 214 or the third-party system 216 can send 3D objects to the platform 102, such as 3D objects created from images of physical photo shoots, or 3D objects created by other 3D modeling programs.

Figure 3:
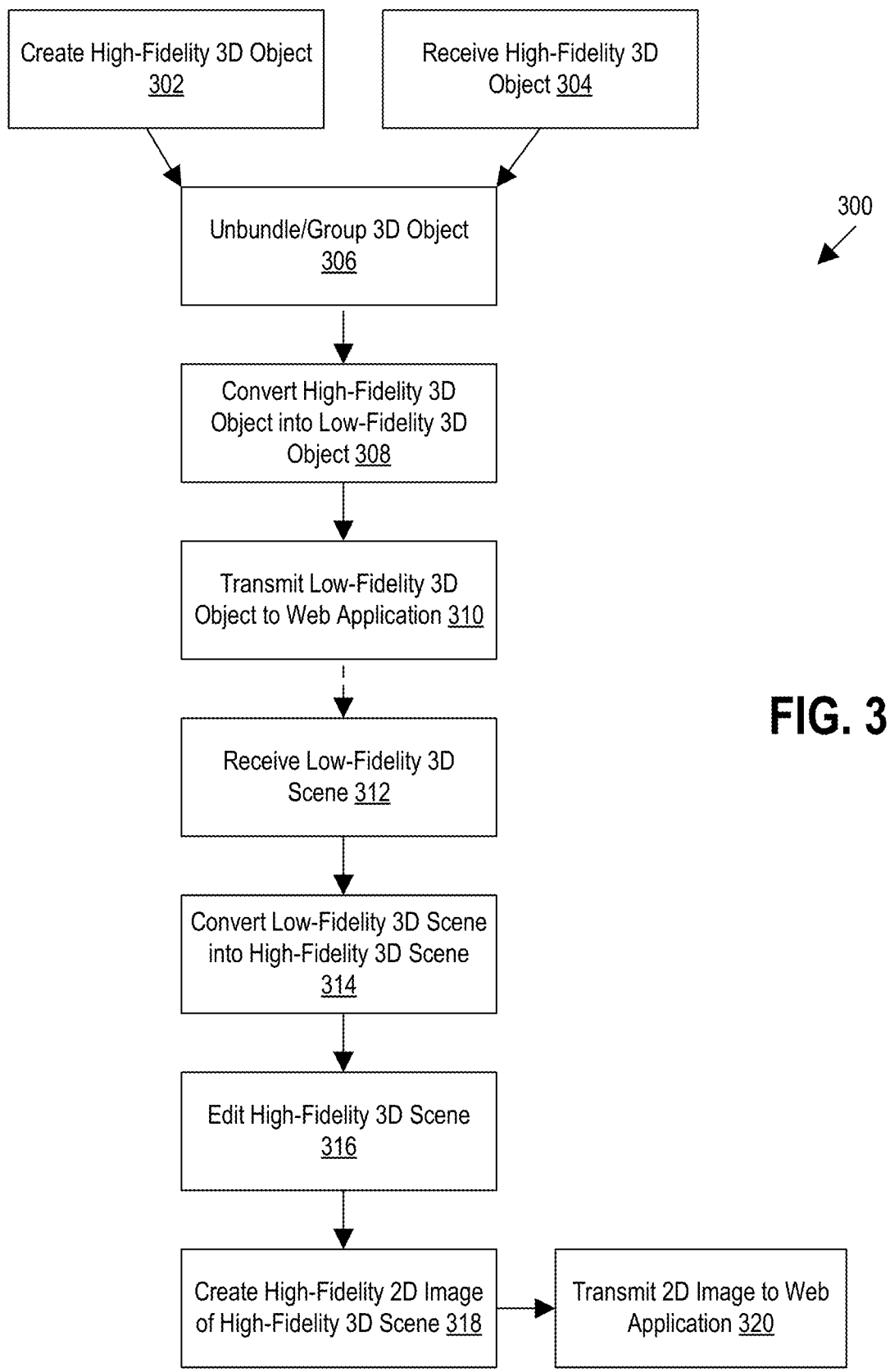
FIG. 3 is a flowchart illustrating an example method of performing certain aspects of the present disclosure.
Figure 4:
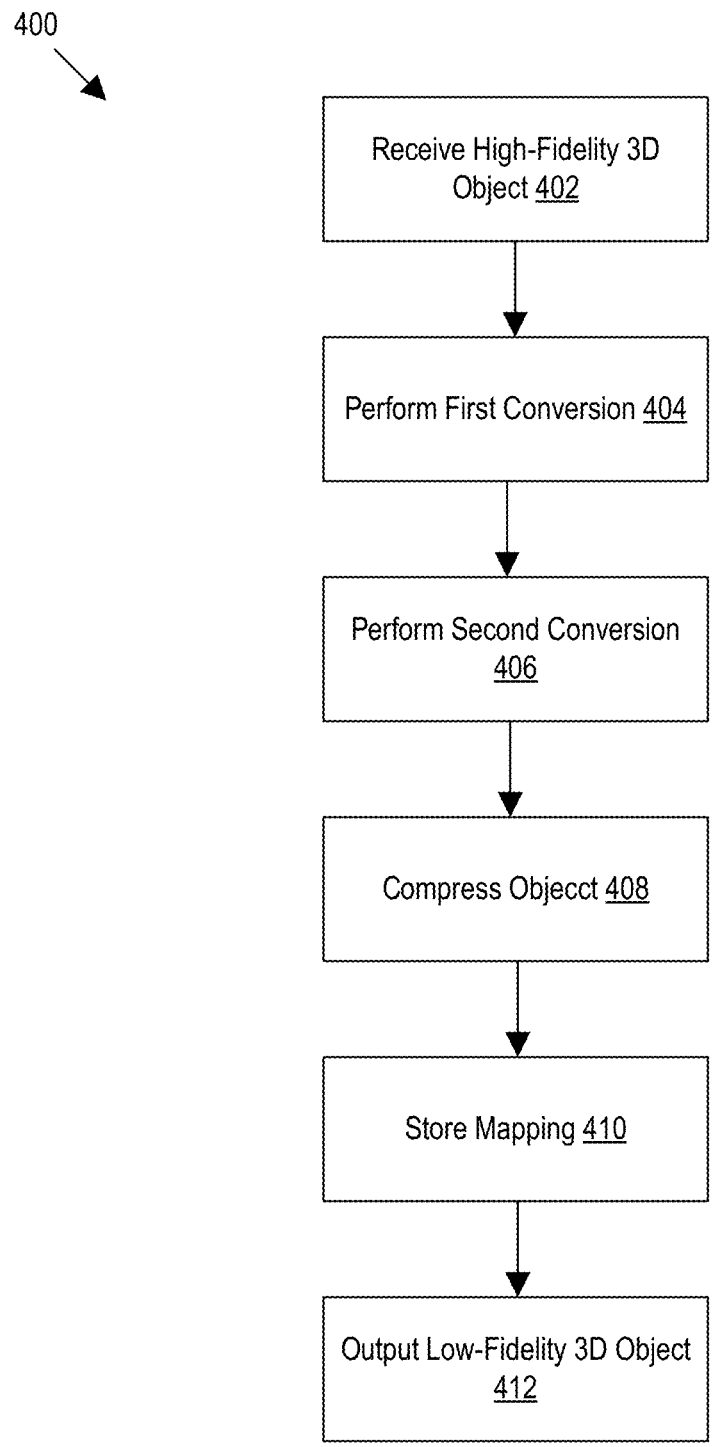
FIG. 4 is a flowchart illustrating an example method of receiving a high-fidelity 3D object and converting it into a low-fidelity 3D object.
Figure 5:
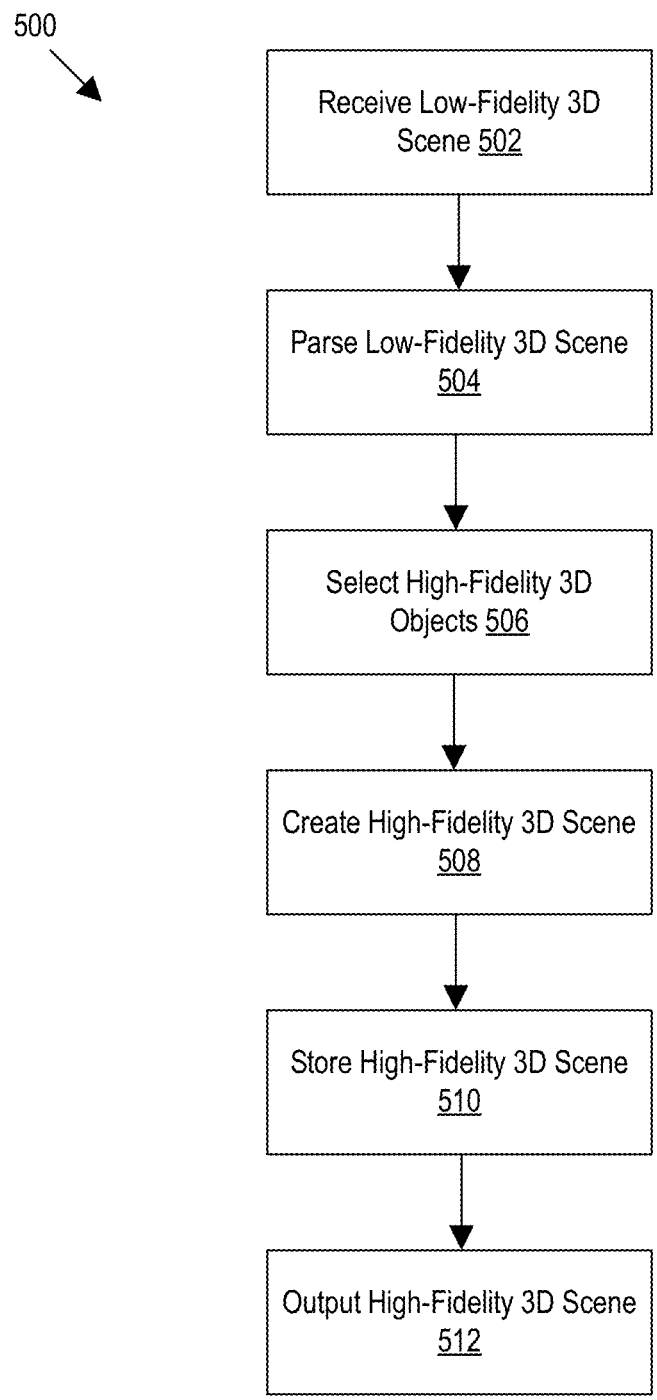
FIG. 5 is a flowchart illustrating an example method of receiving a low-fidelity 3D scene and converting it into a high-fidelity 3D scene.

FIGS. 3-5 illustrate flowcharts of example methods useable by the platform 102 and components of the platform 102. The example methods of FIGS. 4 and 5 illustrate how specific steps of the method of FIG. 3 (e.g., step 308 and step 314) can be performed in example embodiments.

FIG. 3 is a flowchart of a method 300 useable by the platform 102 for facilitating the creation of high-fidelity 2D images of scenes. In the example shown, the method 300 begins by either creating a high-fidelity 3D object (step 302) or by receiving a high-fidelity 3D object (step 304). For example, the computer graphics program 202 can create a high-fidelity 3D object, or the platform 102 can receive the high-fidelity 3D object from the internal system 214 or third-party system 216. The high-fidelity 3D object can be, for example, an object stored as a MAX file, an OBJ file, or another 3D object file type. The high-fidelity 3D object can represent, for example, a product, a part of a product, a template of a room or area, or a prop that is displayable in a scene but is not a product. The platform 102 can, in some embodiments, store the high-fidelity 3D object in the object database 218.

In the example shown, the platform 102 can unbundle or group a 3D object (step 306). With respect to unbundling, a high-fidelity 3D object can, for example, have a flag or tag indicating that it contains subcomponents that are also high-fidelity 3D objects. The platform 102 can read the tag and can unbundle the subcomponents. For example, if the high-fidelity 3D object is a bed, then it may have a tag indicating that it has subcomponents, such as a bed frame, pillows, and a blanket, each of which can also be high-fidelity 3D objects. Once the subcomponents are unbundled (e.g., at step 306), then the platform 102 can apply the object conversion service 204 to each high-fidelity 3D subcomponent (e.g., at 308), resulting in a low-fidelity 3D subcomponent for each high-fidelity 3D subcomponent. As is further explained below, a mapping between each high-fidelity 3D object (including if the object is a subcomponent) and its corresponding low-fidelity 3D object can be stored in the object mapping database 206. Furthermore, in some embodiments, the platform 102 can, after unbundling an object, tag the subcomponents as being part of one high-fidelity 3D object, thereby allowing the subcomponents to be regrouped later.

With respect to grouping, a high-fidelity 3D object can, for example, have a tag indicating that it is part of a group with other high-fidelity 3D objects. For example, if the high-fidelity 3D object is a television, it may have a tag indicating that it can be grouped with a speaker as part of an entertainment system. In some embodiments, the platform 102 can group the television with the speaker to form a high-fidelity 3D object representing the entertainment system. Then the platform can (e.g., at step 308) convert the high-fidelity entertainment system, as well as the television and speaker individually, into low-fidelity 3D objects.

In the example shown, the platform 102 can convert a high-fidelity 3D object (e.g., the high-fidelity 3D object created at step 302 or received at step 304) into a low-fidelity 3D object (step 308). As is further described below in connection with FIG. 4, the platform 102 can, for example, use the object conversion service 204 to convert, compress, and optimize the high-fidelity 3D object, resulting in a low-fidelity 3D object. Furthermore, the platform 102 can apply the object conversion service 204 to a plurality of high-fidelity 3D objects, resulting in a plurality of low-fidelity 3D objects. Additionally, as is further described below, the platform 102 can store a mapping between a high-fidelity 3D object and the low-fidelity 2D object that the high-fidelity 3D object is converted into. For example, the mapping can be stored in the object mapping database 206, where it can be accessed and used later by the platform 102 performing the method 300 (e.g., at step 314).

In the example shown, the platform 102 can transmit the low-fidelity 3D object (e.g., created at step 308) to the web application 104 (step 310). In some embodiments, the platform 102 can transmit a plurality of low-fidelity 3D objects to the web application 104. The web application 104, in turn, can receive the low-fidelity 3D objects and incorporate them into a user interface, which is further described below in connection with FIGS. 6-8. A user of the user interface can then design a scene using the low-fidelity 3D objects sent by the platform 102.

In the example shown, the web application 104 can transmit (for example in response a user render request via the user interface) a low-fidelity 3D scene, and the platform 102 can receive the low-fidelity 3D scene (step 312). In some embodiments, the low-fidelity 3D scene can be a JSON object. The low-fidelity 3D scene can include a plurality of low-fidelity 3D objects and a spatial relationship between the low-fidelity 3D objects. Furthermore, each low-fidelity 3D object of the low-fidelity 3D scene can include other information related to how it is portrayed in the scene. For example, such information can relate to the size, rotation, tilt, color, design, relative position, or any other characteristic of an object. Furthermore, the platform 102 can receive other information related to the low-fidelity 3D scene. In some embodiments, this information can be part of the low-fidelity 3D scene; in other embodiments, this information can be sent separately (e.g., in a different JSON object). The information can relate to rendering parameters, such as the camera angle, light or shading settings, or any other information related to how the scene is to be rendered. Additionally, in some embodiments, the information can include metadata of the low-fidelity 3D scene, such as an identifier of the user or users who created it or when it was created.

In the example shown, the platform 102 can convert a low-fidelity 3D scene into a high-fidelity 3D scene (step 314). For example, the platform 102 can use the scene conversion service 208 to automatically convert a low-fidelity 3D scene received from the web application 104 (e.g., at step 312) into a high-fidelity 3D scene. In some embodiments, the scene conversion service 208 can parse the low-fidelity 3D scene into tokens (e.g., elements) that are used in a script that is executable by the computer graphics program 202 for automatically reconstructing the low-fidelity 3D scene as a high-fidelity 3D scene (using for example stored mappings between high-fidelity 3D objects and low-fidelity 3D objects). In some embodiments, the low-fidelity 3D scene and the high-fidelity 3D scene can be stored in the scene database 220. The scene conversion service 208 is further described below in connection with FIG. 5. In some embodiments, once the high-fidelity 3D scene is created, it can be viewable and editable in the computer graphics program 202, and it can be transmitted to another system.

In the example shown, the platform 102 can edit the high-fidelity 3D scene (step 316). For example, after a low-fidelity 3D scene is converted to a high-fidelity 3D scene (e.g., at step 314), a user (e.g., the user 210 of FIG. 2) can use the computer graphics program 202 to further edit the high-fidelity 3D scene. In some embodiments, the user can perform edits that may not be possible on the web application, such as edits related to lighting and shading of objects. Additionally, a user 210 can perform any other modifications on the high-fidelity 3D scene that the computer graphics program 202 can perform.

In the example shown, the platform 102 can create a high-fidelity 2D image of the high-fidelity 3D scene (step 318). To do so, the platform 102 can, in some embodiments, use rendering capabilities of the computer graphics program 202. The high-fidelity 2D image's file format can be, for example, PNG, JPEG, or another 2D image file format. When rendering, the platform can use rendering parameters and other information sent by the web application 104 (e.g., at step 312). For example, a rendering request from the web application 104 may include information related to rendering at a certain image quality, to a certain file format, from a certain camera angle, or with certain visual qualities. Additionally, other information from the platform 102 or web application 104 can be used in the rendering. Following the render, the platform can store the resultant 2D image or images in the scene database 220 or transmit them to another system.

In the example shown, the platform 102 can transmit the 2D images (e.g., rendered at step 318) to the web application 104 (step 320). The web application 104, in turn, can receive the images and display them via the user interface to a user. In some embodiments, the platform 102 can send a plurality of rendered images to the web application 104.

FIG. 4 is a flowchart illustrating an example method 400 of receiving a high-fidelity 3D object and converting it into a low-fidelity 3D object. The method 400 can be performed during the method 300 to convert a high-fidelity 3D object into a low-fidelity 3D object (e.g., at step 308). In some embodiments, the object conversion service 204 of FIG. 2 can perform the method 400; thus, the method 400 can be available to the platform 102 and to the object conversion service user 212.

The method 400 begins by receiving a high-fidelity 3D object (step 402). In some embodiments, the high-fidelity 3D object can be in a MAX file format. In some embodiments, the object conversion service 204 can use a queue manager to receive the high-fidelity 3D object. The queue manager can ensure, for example, that the object conversion service 204 receives only a certain number of objects for conversion, and that they are received in an appropriate order. Furthermore, in some embodiments, a job identifier and conversion status data can be stored in a database of the platform 102. This data can be updated during the steps of the method 400, thereby allowing a user or the platform 102 to track the status of an object that is being converted from a high-fidelity 3D object into low-fidelity 3D object.

In the example shown, the object conversion service 204 can perform a first conversion on the object (step 404). In some embodiments, the object conversion service 204 can reduce the object's size or change the object's file format by performing the first conversion. To perform the first conversion, the object conversion service 204 can, for example, use a computer graphics program, such as the computer graphics program 202 of FIG. 2, along with plug-ins and other programs.

The first conversion (step 404) can include a plurality of steps. In some embodiments, the object conversion service 204 can validate the high-fidelity 3D object (e.g., confirm that the data is not corrupted and that the object corresponds to an expected object) and remove some data (e.g., clean the object). In some embodiments, the first conversion can include classifying elements of the object based on transparency or opaqueness. After this classification, the object conversion service 204 can combine opaque elements and combine transparent elements. Furthermore, in some embodiments, the object conversion service 204 can, based on a polygon count of the object, use one or more optimizers on the object. Furthermore, in some embodiments, the object conversion service 204 can perform texture baking on the object. By performing texture baking, the object conversion service 204 can, for example, reduce the polygon count of the object and reduce its size. In some embodiments, the object conversion service 204 can, as part of the first conversion, convert the object into an FBX file; in other embodiments, the object conversion service 204 can convert the object into another file. Furthermore, in some embodiments, the object conversion service 204 can generate a thumbnail image of the object. The thumbnail image can then be transmitted or stored. In other embodiments, the platform 102 or the object conversion service 204 can generate a thumbnail image at a different step in the method 400 or during a different process.

In the example shown, the object conversion service 204 can perform a second conversion on the object (step 406). The object conversion service 204 can, for example, apply a transcoder to convert the object from one file type to another. The transcoder can receive, for example, an FBX file created during the first conversion (i.e., step 304) and can convert that file into a different file format, such as, for example, a gltf, glb, or usdz file. Consequently, the second conversion can, in some embodiments, decrease the size of the object and increase its compatibility with certain applications, such as web applications. In some embodiments, the transcoder can use parts of Facebook Transcoder. Furthermore, in some embodiments, the second conversion can also include other conversions, compressions, or optimizations of the object.

In the example shown, the object conversion service 204 can compress the object (step 408). The object conversion service 204 can apply a plurality of programs to compress the object in different ways. For example, the object conversion service 204 can compress both the mesh and texture of the object. To do so, the object conversion service 204 can, in some embodiments, apply a library (e.g., Draco, an open-source compression and decompression library) to compress the mesh and another program (e.g., KTX) to compress the texture.

In the example shown, the object conversion service 204 can store a mapping between the high-fidelity 3D object and the low-fidelity 3D object (step 410). For example, the object conversion service 204 can store data indicating that the high-fidelity 3D object received by the object conversion service 204 (e.g., at step 402) corresponds with the low-fidelity 3D object output by the compression services (e.g., at step 408, after having gone through the steps 404-408). In some embodiments, the mapping can be one or more entries in one or more data tables showing a relationship between data representing the high-fidelity 3D object and data representing the low-fidelity 3D object. This mapping data can be stored, for example, in the object mapping database 206 of FIG. 1, and it can be used, as is further explained below, to create a high-fidelity 3D scene based on a low-fidelity 3D scene. In addition to storing the mapping data, the object conversion service 204 can also store the high-fidelity 3D object and the low-fidelity 3D object in the object database 218. Because of the processes applied by the object conversion service 204 (e.g., at steps 404-408), the low-fidelity 3D object is smaller than the high-fidelity 3D object.

In the example shown, the object conversion service 204 can output the low-fidelity 3D object (step 412). For example, in the context of the method 300 of FIG. 3 (described above), the low-fidelity 3D object can then be transmitted to a web application (e.g., at step 310). Additionally, in the case where the object conversion service 204 is being used as an API, for example, then the object conversion service 204 can output the low-fidelity 3D object to the object conversion service user 212 of FIG. 2.

FIG. 5 is a flowchart illustrating an example method 500 of receiving a low-fidelity 3D scene and converting it into a high-fidelity 3D scene. The method 500 can be used by the method 300 of FIG. 3 to convert a low-fidelity 3D scene into a high-fidelity 3D scene (e.g., at step 314). In some embodiments, the scene conversion service 208 can, along with other programs, perform the method 500.

In the example shown, the method 500 begins by receiving a low-fidelity 3D scene (step 502). As described above, the platform 102 can receive a low-fidelity 3D scene from the web application 104. In some embodiments, the platform 102 can then send the low-fidelity 3D scene to the scene conversion service 208, which receives the low-fidelity 3D scene as part of performing the method 500 (e.g., at step 502). In some embodiments, the low-fidelity 3D scene can be represented as a JSON object; in other embodiments, it can be in a different file format. In some embodiments, the scene conversion service 208 can use a queue manager to receive the low-fidelity 3D scene. The queue manager can, for example, ensure that the scene conversion service 208 receives a certain number of scenes for conversion, that they are in a certain format, and that they are received in an appropriate order. Furthermore, in some embodiments, a job identifier and conversion status data can be stored in a database. The job identifier and the conversion status data can be updated during the steps of the method 500, thereby allowing a user or the platform 102 to track the status of a scene that is being converted.

In the example shown, the scene conversion service 208 can parse the low-fidelity 3D scene (step 504). In some embodiments, after receiving the low-fidelity 3D scene, the scene conversion service 208 can identify the file format of the scene and execute a parser (or serializer). The parser can, in some embodiments, convert the data contained in the low-fidelity 3D scene into tokens or into another type of data. The tokens can be, for example, small pieces of data that represents the low-fidelity scene and that can be read by a script. For example, if the low-fidelity 3D scene is a JSON object, then the parser can read the properties of the JSON object and can create tokens based on these properties. The tokens can then be used in an executable script for recreating the 3D scene in another program, such as the computer graphics program 202. In some embodiments, the parser can be a custom-built program designed to interpret objects sent from the web application 104; in other embodiments, the parser can be based on another program, or it can be a service called by the scene conversion service 208.

In the example shown, the scene conversion service 208 can select high-fidelity 3D objects for use in the high-fidelity 3D scene (step 506). In some embodiments, the scene conversion service 208 can select high-fidelity 3D objects that were stored in the object database 218 by the platform 102 while performing the method 300 of FIG. 3 (e.g., at step 302 or 304). To determine which high-fidelity 3D objects to select, the scene conversion service 208 can use a program (e.g., the computer graphics program 202) to execute a script that uses tokens created by the parser. In some embodiments, the computer graphics program 202, executing the script, can determine which low-fidelity 3D objects were used in the low-fidelity 3D scene, access the object mapping database 206 to determine which high-fidelity 3D objects correspond to those low-fidelity 3D objects, and select those high-fidelity 3D objects from the object database 218. Furthermore, in some embodiments, if a high-fidelity 3D object cannot be determined by using the object mapping database 206 or found in the object database 218, then the platform 102 can send a communication to the web application 104, to a user, or to another system, indicating that an object cannot be found. In other embodiments, the scene conversion service 208 can select high-fidelity 3D objects based on data read directly from the low-fidelity 3D scene or from other data.

In the example shown, the scene conversion service 208 can create the high-fidelity 3D scene (step 508). In some embodiments, the scene conversion service 208 can use the computer graphics program 202 to create the high-fidelity 3D scene. For example, the computer graphics program 202 can use the high-fidelity 3D objects selected at step 506 to create the high-fidelity 3D scene. Furthermore, in some embodiments the computer graphics program 202, executing the script, can place the high-fidelity 3D objects in a scene based on a spatial relationship corresponding to the spatial relationship of the objects in the low-fidelity 3D scene. The spatial relationship be, for example, data indicating where the objects are in relation to one another or data indicating where the objects are in a coordinate system. Additionally, in some embodiments the computer graphics program 202 can edit the high-fidelity 3D objects in the scene. For example, the computer graphics program 202 can, based on the information of the low-fidelity 3D scene, perform edits related to the size, rotation, tilt, color, design, or any other characteristic of how an object was portrayed in the low-fidelity 3D scene. In other embodiments, the scene conversion service 208 can use another program to recreate the low-fidelity 3D scene as a high-fidelity 3D scene.

In the example shown, the scene conversion service 208 can store the high-fidelity 3D scene (step 510). For example, the scene conversion service 208 can store the high-fidelity 3D scene (created, for example, by the computer graphics program 202 executing a script during the steps 506-508) in the scene database 220. In some embodiments, the scene can be stored as a MAX file; in other embodiments, it can be stored as a different file type or in a different location.

In the example shown, the scene conversion service 208 can output the high-fidelity 3D scene (step 512). For example, the platform 102, performing the method 300, can then further edit the high-fidelity 3D scene (e.g., step 316).

In some embodiments, the scene conversion service 208 can output the high-fidelity 3D scene to a user or to another system.

Figure 6:
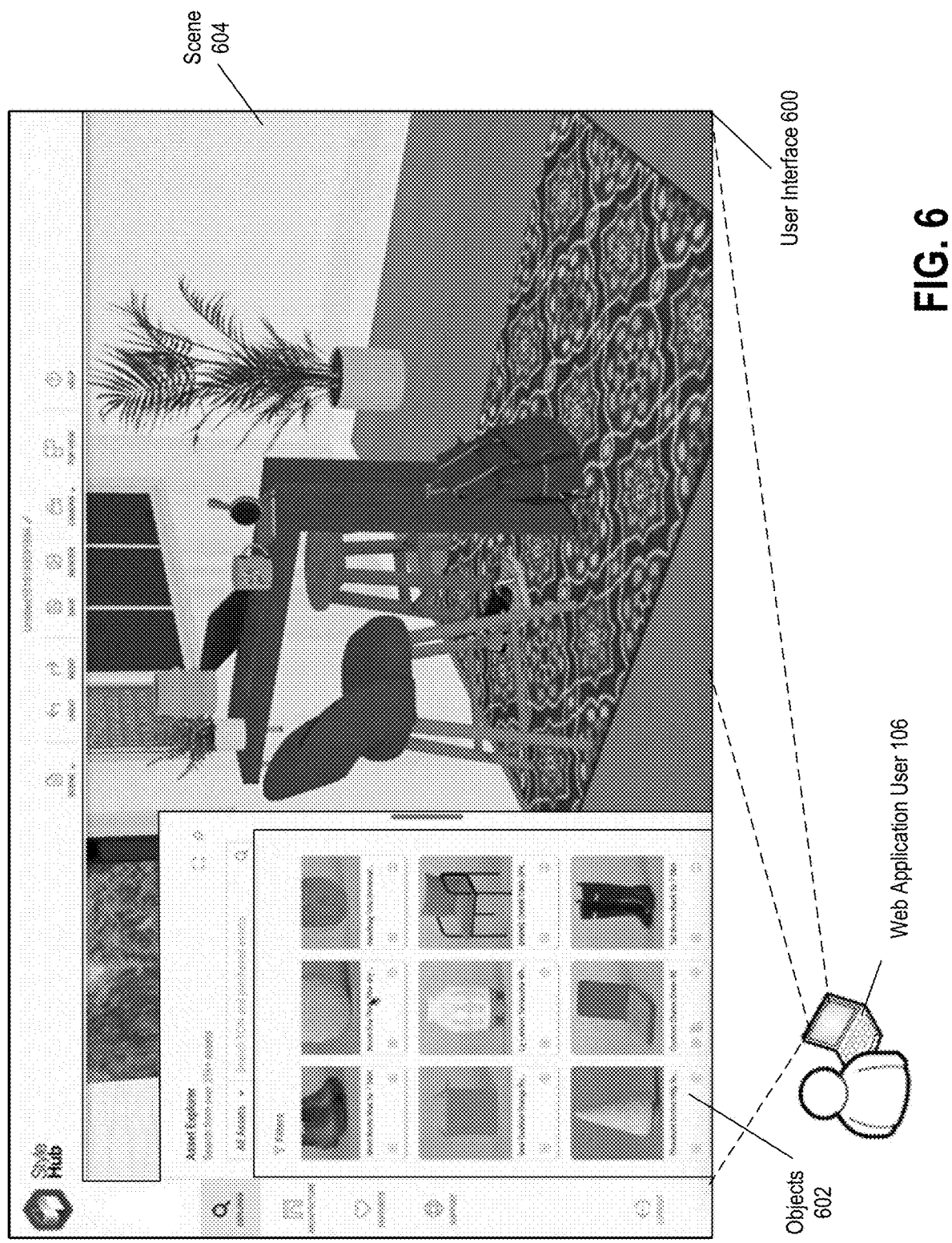
FIG. 6 illustrates a first example user interface of the present disclosure.
Figure 7:
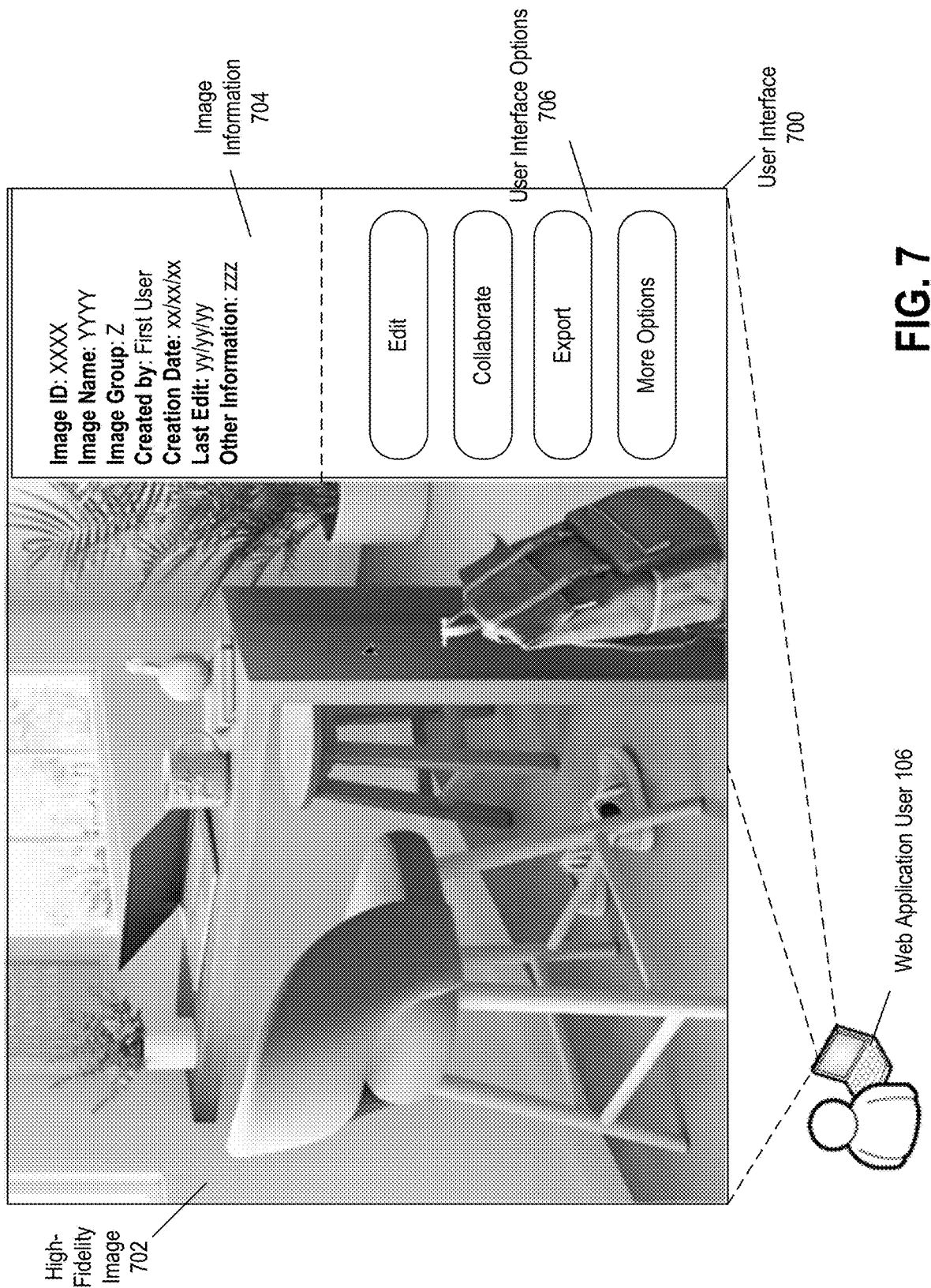
FIG. 7 illustrates a second example user interface of the present disclosure.
Figure 8:
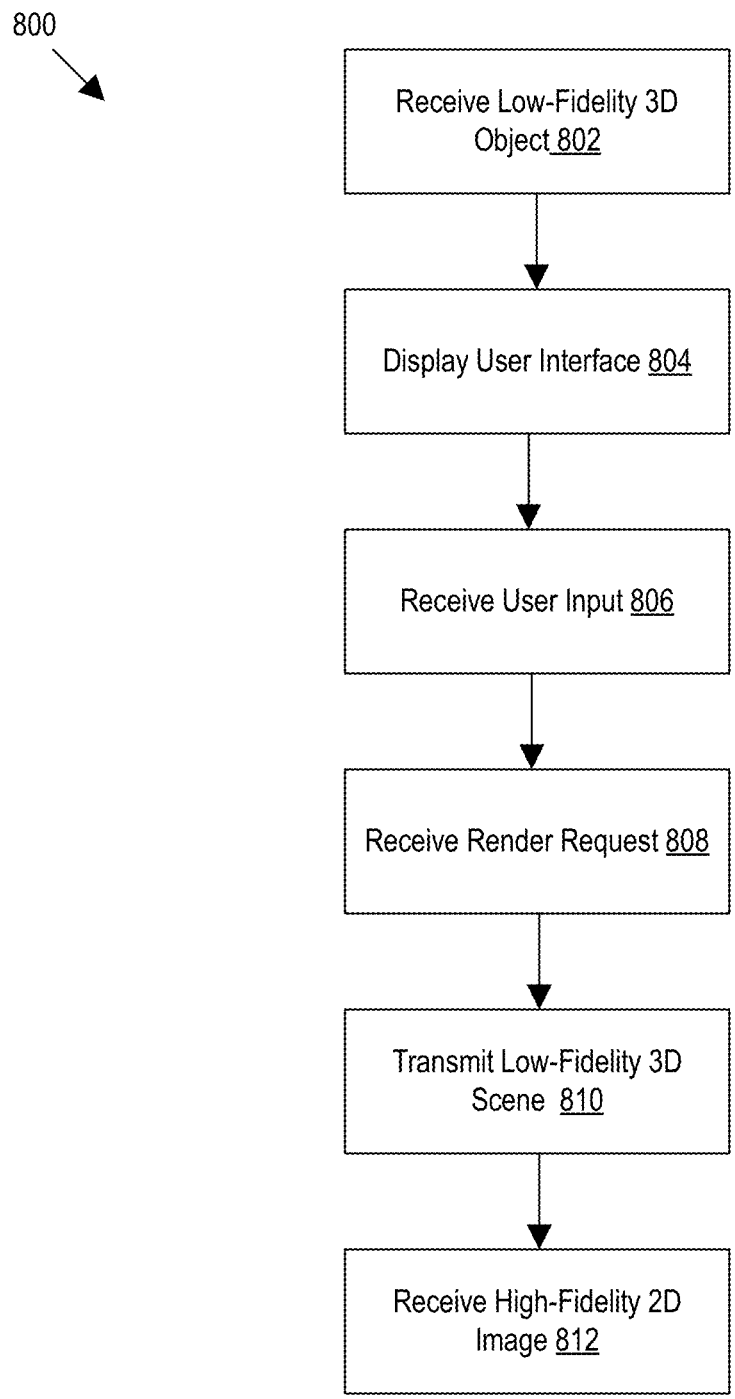
FIG. 8 is a flowchart illustrating an example method of performing certain aspects of the present disclosure.

Referring now to FIGS. 6-8, the web application 104 can include user interfaces for a user of the web application 104 to, among other things, communicate with the platform 102 and to create, edit, and display 3D scenes and 2D images. Furthermore, as explained in connection with FIG. 8, the web application can perform an example method for facilitating web-based creation of 3D scenes that result in high-fidelity 2D images.

FIG. 6 illustrates an example user interface 600 of the present disclosure. The user interface 600 can be displayed by the web application 104 to the web application user 106 via a web browser. In some embodiments, the user interface 600 includes low-fidelity 3D objects received by the web application 104 from the platform 102, as described above. Because the low-fidelity objects are smaller and supported in a web application, they can be displayed by a web browser and directly manipulated by a user of the web application 104.

Among other things, the user interface 600 can display low-fidelity 3D objects 602 and a low-fidelity 3D scene 604. The user 106 can select one or more low-fidelity objects, including a template, and place them into the scene. To do so, the user 106 can, in some embodiments, drag and drop the objects from a searchable list of objects. When selecting an object to use in the scene, the user 106 can, in some embodiments, search a list of objects or apply filters to find an object. Additionally, the user 106 can alter the appearance of the objects 602. For example, after placing an object in the scene, the user 106 can edit the object by, for example, rotating it, changing its size, changing its color or design, moving it, removing it, or editing it in some other way. In some embodiments, the user 106 can group objects together to form a single object or can manipulate a particular subcomponent of an object. Furthermore, in some embodiments, the user interface 600 can include other features that are standard in 3D modeling programs. For example, the features of the user interface 600 can include, but are not limited to, changing the view, saving, tracking changes, deleting, sharing, sending, tagging, commenting, or undoing a previous edit.

Furthermore, in some embodiments, the user interface 600 can include collaboration features. The collaboration feature can allow more than one user accessing the web application 104 to work on the scene 604. For example, the user interface 600 can include an option that can be selected to share a scene, an object, or other data with another user of the web application. Furthermore, the user interface 600 can include a message system for users to communicate. The message system can include, for example, an area to leave comments regarding the scene 604 or an object in the scene, or it can include an input field for sending a message directly to another user. In some embodiments, once a scene is shared, multiple users, accessing the web application 104 from separate devices, can edit the scene 604 at the same time and can communicate with one another via the message system.

Furthermore, in some embodiments, the user interface 600 can include features for managing objects, some of which can be products. For example, the user interface 600 can include options that can be used to provide information about a product. For example, if a particular chair is out of stock, or is part of a sale, then the user 106 can use options of the user interface 600 to input information associated with the object representing the chair, thereby informing other users of the web application 104 about the status of the chair. Furthermore, in some embodiments, the user interface 600 can include features for communicating with the platform 102 about objects. For example, if a low-fidelity 3D object representing a particular product is not available in the web application 104, then the user can, via the user interface 600 request that the platform 102 send such an object to the web application 104. Similarly, the user 106 can, via the user interface 600, report a problem to the platform 102. For example, if an object is not as expected, then the user 106 can report it to the platform 102 via the web application 104.

Furthermore, in some embodiments, the user interface 600 can include a render feature. For example, the user 106 can select a button to generate a request to render the scene 604 as a high-fidelity 2D image. In some embodiments, the web application 104 can then create a data object representing the scene. The data object can include, among other things, one or more objects of the manipulatable objects 602 that have been selected to be in the scene, the edits made to the objects, and a spatial relationship between the objects. In some embodiments, the data object can also include metadata of the scene, such as when the scene was created and what users created the scene. The web application 104 can then send that data, along with other possible data, to the platform 102, as described above. Furthermore, in some embodiments, the user 106 can include render parameters when creating a render request. For example, in some embodiments, the user can specify, via the user interface 600, one or more camera angles from which the scene 604 is to be rendered. Furthermore, in some embodiments, the user can send other parameters related to the render, such as light or shading settings, render or image quality, file type, and any other information related to the render.

FIG. 7 illustrates an example user interface 700. In some embodiments, the user interface 700 can be displayed to the user 106 by the web application 104 via a web browser. In some embodiments, the user interface 700 can include a high-fidelity 2D image 702, image information 704, and user interface options 706. The high-fidelity 2D image 702 can be a rendering of a 3D scene, such as the scene 604 of FIG. 6. For example, the web application 104, after sending the scene 604 to the platform 102, can receive the high-fidelity 2D image 702 as a high-fidelity 2D representation of the low-fidelity 3D scene 604. Having received the image 702, the web application 104 can, in some embodiments, display it to the user 106 via the user interface 700.

In some embodiments, the image information 704 can include information related to the image 702. For example, the image information 704 can include an identification number of the image, an image name, a category to which the image belongs, a creation date of the image, a creator of the image, and other information related to the image. Furthermore, in some embodiments, the user interface 700 can include user interface options 706. In some embodiments, the user 106 can use an edit option of the user interface options 706 to edit a low-fidelity 3D scene that the image 702 is based on. For example, upon selecting the edit button, the web application 104 can, in some embodiments, display the user interface 600. In some embodiments, the user 106 can edit the image 702 directly, without editing the 3D scene that the image 702 is based on. In addition to the edit option, the user interface options 706 can also include, in some embodiments, options for collaborating with other users, exporting the image 702, and other options. Upon selecting the collaboration option, the web application 104 can, in some embodiments, display a message system and other features described above in connection with FIG. 6.

Upon selection of the export option, the web application 104 can, in some embodiments, display a field for selecting a destination to share the image 702 and the image information 704 and a field for selecting a format in which to share the data.

In addition to the user interfaces 600 and 700, the web application 104 can also include other user interfaces. For example, the web application 104 can include other interfaces for creating 3D scenes, which allows user manipulation of the 3D scene, including introduction, placement, and adjustment of 3D objects within such a scene. Furthermore, the web application 104 can include a login user interface, in which a user inputs a username and password to access the application. The web application 104 can also include user interfaces for user collaboration. The web application 104 can also include user interfaces for managing files. The web application 104 can also include user interfaces that facilitate communication with the platform 102, and that assist with editing digital 3D objects, 3D scenes, or 2D images.

FIG. 8 is a flowchart illustrating an example method 800 of creating a low-fidelity 3D scene and receiving a high-fidelity 2D rendering based on the scene. In some embodiments, the web application 104 can perform the method 800. In the example shown, the web application 104 can receive a low-fidelity 3D object (step 802). For example, the platform 102 can, as described above, convert a high-fidelity 3D object into a low-fidelity 3D object and transmit it. The web application 104, in turn, can receive it. Furthermore, in some embodiments, the web application 104 can receive a plurality of low-fidelity 3D objects, the web application 104 can receive other information related to the low-fidelity 3D object, and the web application 104 can store the low-fidelity 3D object.

In the example shown, the web application 104 can display a user interface (step 804). As described above, a user, such as the user 106, can access the web application 104 on the internet, for example by using a web browser. The web application 104 can then display a user interface to the user 106. For example, the web application can display the user interface 600, the user interface 700, or another user interface to the user 106.

In the example shown, the web application 104 can receive a user input (step 806). For example, as described above, a user interface displayed by the web application 104 can include various means for a user to interact with the web application 104, including selecting an object, editing an object, or selecting an option of the user interface. The user input received by the web application 104 can be sent via one or more of these various means. For example, the web application 104 can, in some embodiments, receive user input in response to the user selecting, dragging, dropping, or editing an object. Furthermore, the web application 104 can, in some embodiments, receive user input in response to a user selecting a button or using a feature of a user interface, or entering data into an input field of the user interface.

In the example shown, the web application 104 can receive a render request (step 808). For example, as described above, a user can, via a user interface, send the web application 104 a request to render a scene. The application 104 can receive the render request and any data related to the render request, as described above. Furthermore, in some embodiments, the web application 104 can structure the render request as a JSON object or another data object. Furthermore, in some embodiments, the web application 104 can store the render request in a database.

In the example shown, the web application 104 can transmit the render request (step 810). For example, the web application 104 can transmit the render request and other data to the platform 102, as described above. In the example shown the web application 104 can receive a high-fidelity 2D image (step 812). For example, as described above, the web application 104 can receive a high-fidelity 2D rendering, such as the image 702 of FIG. 7, from the platform 102. Furthermore, in some embodiments, the web application 104 can store the image in a database or send it to another program.

Figure 9:
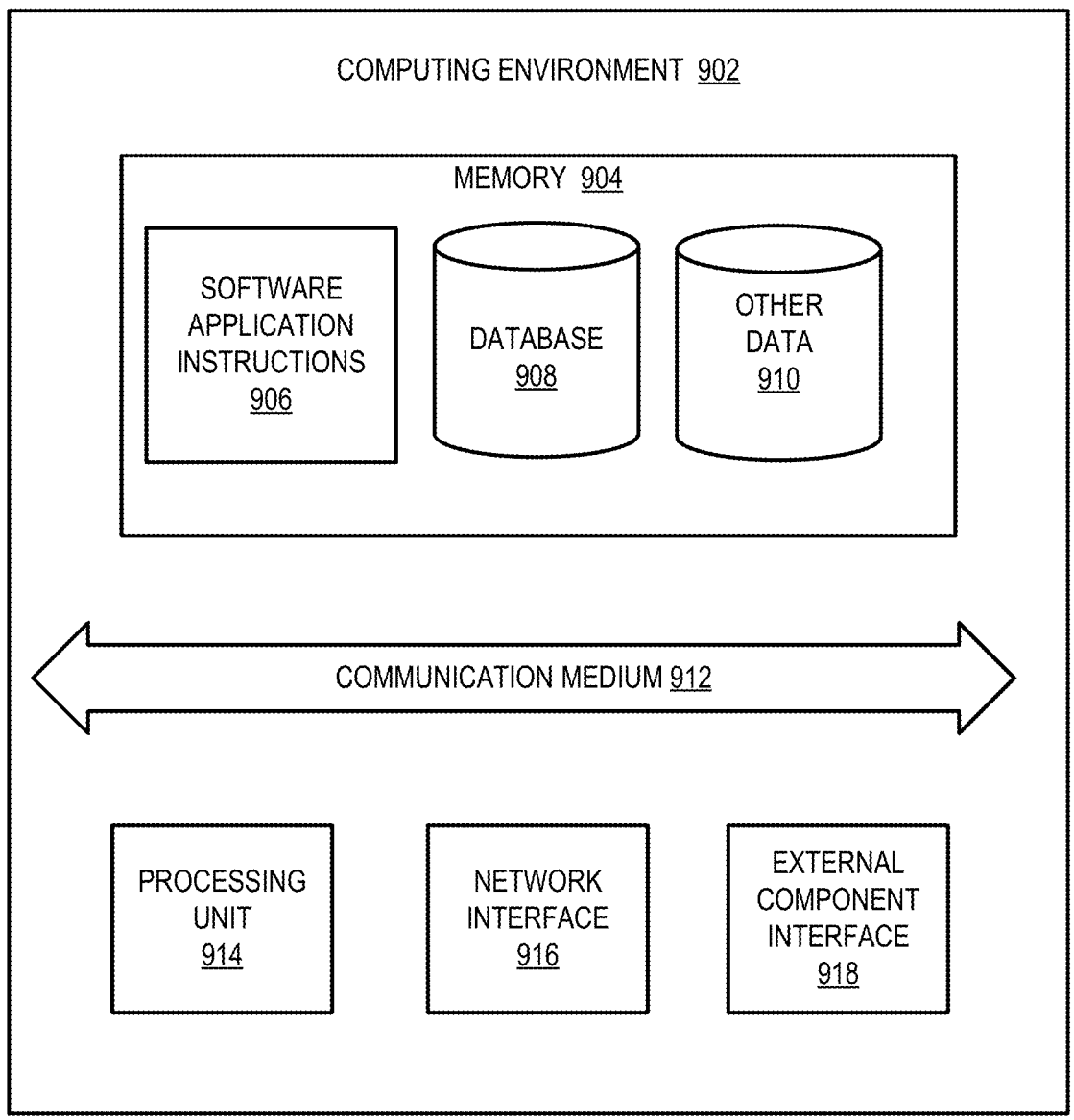
FIG. 9 illustrates an example block diagram of a computing system.

FIG. 9 illustrates an example system 900 with which disclosed systems and methods can be used. In an example, the following can be implemented in one or more systems 900 or in one or more systems having one or more components of system 900: the platform 102, the web application 104, computer graphics program 202, the object conversion service 204, the object mapping database 206, the scene conversion service 208, the object conversion service user 212, the internal system 214, the third-party system 216, the object database 218, and the scene database 220.

In an example, the system 900 can include a computing environment 902. The computing environment 902 can be a physical computing environment, a virtualized computing environment, or a combination thereof. The computing environment 902 can include memory 904, a communication medium 912, one or more processing units 914, a network interface 916, and an external component interface 918.

The memory 904 can include a computer readable storage medium. The computer storage medium can be a device or article of manufacture that stores data and/or computer-executable instructions. The memory 904 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 904 can store various types of data and software. For example, as illustrated, the memory 904 includes software application instructions 906, one or more databases 908, as well as other data 910. The communication medium 912 can facilitate communication among the components of the computing environment 902. In an example, the communication medium 912 can facilitate communication among the memory 904, the one or more processing units 914, the network interface 916, and the external component interface 918. The communications medium 912 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 914 can include physical or virtual units that selectively execute software instructions, such as the software application instructions 906. In an example, the one or more processing units 914 can be physical products comprising one or more integrated circuits. The one or more processing units 914 can be implemented as one or more processing cores. In another example, one or more processing units 914 are implemented as one or more separate microprocessors. In yet another example embodiment, the one or more processing units 914 can include an application-specific integrated circuit (ASIC) that provides specific functionality. In yet another example, the one or more processing units 914 provide specific functionality by using an ASIC and by executing computer-executable instructions.

The network interface 916 enables the computing environment 902 to send and receive data from a communication network. The network interface 916 can be implemented as an Ethernet interface, a token-ring network interface, a fiber optic network interface, a wireless network interface (e.g., Wi-Fi), or another type of network interface.

The external component interface 918 enables the computing environment 902 to communicate with external devices. For example, the external component interface 918 can be a USB interface, Thunderbolt interface, a Lightning interface, a serial port interface, a parallel port interface, a PS/2 interface, or another type of interface that enables the computing environment 902 to communicate with external devices. In various embodiments, the external component interface 918 enables the computing environment 902 to communicate with various external components, such as external storage devices, input devices, speakers, modems, media player docks, other computing devices, scanners, digital cameras, and fingerprint readers.

Although illustrated as being components of a single computing environment 902, the components of the computing environment 902 can be spread across multiple computing environments 902. For example, one or more of instructions or data stored on the memory 904 may be stored partially or entirely in a separate computing environment 902 that is accessed over a network.

Depending on the size and scale of the computing environment 902, it may be advantageous to include one or more load balancers to balance traffic across multiple physical or virtual machine nodes.

Aspects of the system 900 and the computing environment 902 can be protected using a robust security model. In an example, users may be made to sign into the system using a directory service. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

Each node may be configured to be capable of running the full system 900, such that portal can run and schedule jobs and serve the portal user interface as long as a single node remains functional. The environment 902 may include monitoring technology to determine when a node is not functioning so an appropriate action can be taken.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process or method are disclosed (such as the methods 300, 400, 500, and 800), those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A scene builder platform comprising:
   a processor; and
   a memory storing instructions, wherein the instructions, when executed by the processor, cause the scene builder platform to:
   convert a digital three-dimensional (3D) object from a high-fidelity 3D object into a low-fidelity 3D object;
   store a mapping between the high-fidelity 3D object and the low-fidelity 3D object;
   transmit the low-fidelity 3D object to a web application;
   receive, from the web application, a low-fidelity 3D scene;
   convert, using the mapping, the low-fidelity 3D scene into a high-fidelity 3D scene; and
   create a high-fidelity two-dimensional (2D) image of the high-fidelity 3D scene.

2. The scene builder platform of claim 1,
   wherein the low-fidelity 3D scene comprises a plurality of low-fidelity 3D objects and a spatial relationship between the low-fidelity 3D objects;
   wherein the high-fidelity 3D scene comprises a plurality of high-fidelity 3D objects and a spatial relationship between the high-fidelity 3D objects; and
   wherein creating the high-fidelity 2D image of the high-fidelity 3D scene comprises rendering the high-fidelity 3D scene.

3. The scene builder platform of claim 2 further comprising:
   a mapping database;
   wherein the mapping is stored in the mapping database; and
   wherein the mapping database stores data mapping each object of the plurality of high-fidelity 3D objects to a corresponding low-fidelity 3D object of the plurality of low-fidelity 3D objects.

4. The scene builder platform of claim 1, wherein converting the digital 3D object from the high-fidelity 3D object into the low-fidelity 3D object comprises:

performing a first conversion; and
performing a second conversion;
wherein the first conversion reduces a size of the digital 3D object and converts the digital 3D object from a first file type into a second file type; and
wherein the second conversion converts the digital 3D object from the second file type into a third file type.

5. The scene builder platform of claim 1, wherein converting the digital 3D object from the high-fidelity 3D object into the low-fidelity 3D object comprises grouping elements of the digital 3D object based on a transparency or an opaqueness of the elements.

6. The scene builder platform of claim 1, wherein the instructions, when executed, further cause the scene builder platform to:
   compress a texture of the digital 3D object; and
   compress a mesh of the digital 3D object.

7. The scene builder platform of claim 1, wherein the instructions, when executed, further cause the scene builder platform to edit a feature of the high-fidelity 3D scene.

8. The scene builder platform of claim 1, wherein the instructions, when executed, further cause the scene builder platform to:
   select a subcomponent of the digital 3D object;
   convert the subcomponent from a high-fidelity 3D object subcomponent into a low-fidelity 3D object subcomponent;
   store a subcomponent mapping between the high-fidelity 3D object subcomponent and the low-fidelity 3D object subcomponent; and
   transmit the low-fidelity 3D object subcomponent to the web application.

9. The scene builder platform of claim 1, wherein the instructions, when executed, further cause the scene builder platform to:
   receive a camera angle from the web application; and
   wherein creating the high-fidelity 2D image of the high-fidelity 3D scene comprises creating the high-fidelity 2D image of the high-fidelity 3D scene from the camera angle.

10. The scene builder platform of claim 1, wherein converting, using the mapping, the low-fidelity 3D scene into the high-fidelity 3D scene comprises:
    parsing the low-fidelity 3D scene into tokens;
    selecting, based on the tokens, a selected high-fidelity 3D object, the selected high-fidelity 3D object corresponding with a low-fidelity 3D object of the low-fidelity 3D scene; and
    positioning, based on the tokens, the selected high-fidelity 3D object in the high-fidelity 3D scene.

11. The scene builder platform of claim 1, wherein the instructions, when executed, further cause the scene builder platform to transmit the high-fidelity 2D image to the web application.

12. The scene builder platform of claim 1, wherein the instructions, when executed, further cause the scene builder platform to store one or more of the high-fidelity 3D object, the low-fidelity 3D object, the high-fidelity 3D scene, the low-fidelity 3D scene, or the high-fidelity 2D image.

13. A web-based scene builder comprising:
    a processor; and
    a memory storing instructions, wherein the instructions, when executed by the processor, cause the web-based scene builder to:
    receive a low-fidelity three-dimensional (3D) object from a platform, the platform storing a mapping between the low-fidelity 3D object and a high-fidelity 3D object;

display, via a web browser, a user interface, wherein the user interface comprises a plurality of manipulatable low-fidelity 3D objects for creating a low-fidelity 3D scene;

transmit, in response to receiving a render request, the low-fidelity 3D scene to the platform, the render request comprising a camera angle from which to create a high-fidelity two-dimensional (2D) image of the low-fidelity 3D scene; and receive, from the platform, the high-fidelity 2D image of the low-fidelity 3D scene.

14. The web-based scene builder of claim 13, wherein the high-fidelity 2D image is created by converting the low-fidelity 3D scene into a high-fidelity 3D scene and rendering the high-fidelity 3D scene.

15. The web-based scene builder of claim 14,
wherein the low-fidelity 3D scene comprises a plurality of selected low-fidelity 3D objects of the plurality of manipulatable low-fidelity 3D objects and a spatial relationship between the plurality of selected low-fidelity 3D objects;
wherein the high-fidelity 3D scene comprises a plurality of high-fidelity 3D objects and a spatial relationship between the plurality of high-fidelity 3D objects;
wherein each object of the plurality of high-fidelity 3D objects corresponds with an object of the plurality of selected low-fidelity 3D objects.

16. The web-based scene builder of claim 13, wherein an object of the plurality of manipulatable low-fidelity 3D objects can, by a user of the user interface, be dragged and dropped, rotated, and enlarged or shrunk.

17. The web-based scene builder of claim 13, wherein the instructions, when executed, further cause the web-based scene builder to perform one or more of:
sharing one or more of the low-fidelity 3D scene or the high-fidelity 2D image; or
storing one or more of the low-fidelity 3D scene or the high-fidelity 2D image.

18. The web-based scene builder of claim 13, wherein the instructions, when executed, further cause the web-based scene builder to display a second user interface, the second user interface displaying the high-fidelity 2D image.

19. The web-based scene builder of claim 13, wherein the render request further comprises an image quality and a file type.

20. A scene builder system comprising:
a platform comprising a platform processor and a platform memory storing platform instructions; and
a web application communicatively coupled with the platform, the web application comprising a web application processor and a web application memory storing web application instructions;
wherein the platform instructions, when executed by the platform processor, cause the platform to:
convert a digital three-dimensional (3D) object from a high-fidelity 3D object into a low-fidelity 3D object;
store a mapping between the high-fidelity 3D object and the low-fidelity 3D object;
transmit the low-fidelity 3D object to the web application;
receive, from the web application, a low-fidelity 3D scene;
convert, using the mapping, the low-fidelity 3D scene into a high-fidelity 3D scene;
create a high-fidelity two-dimensional (2D) image of the high-fidelity 3D scene; and
transmit the high-fidelity 2D image to the web application; and
wherein the web application instructions, when executed by the web application processor, cause the web application to:
receive the low-fidelity 3D object from the platform;
display, via a web browser, a user interface, wherein the user interface comprises a plurality of manipulatable low-fidelity 3D objects for creating a low-fidelity 3D scene;
transmit, in response to receiving a render request, the low-fidelity 3D scene to the platform; and
receive, from the platform, the high-fidelity 2D image.

* * * * *